Oct. 24, 1967     A. WAGENLEITNER ET AL     3,349,215
ARC PROCESS FOR WELDING WITH NON-CONSUMABLE
ELECTRODES FOR WELDING THIN SHEETS
Filed Dec. 15, 1966     3 Sheets-Sheet 1
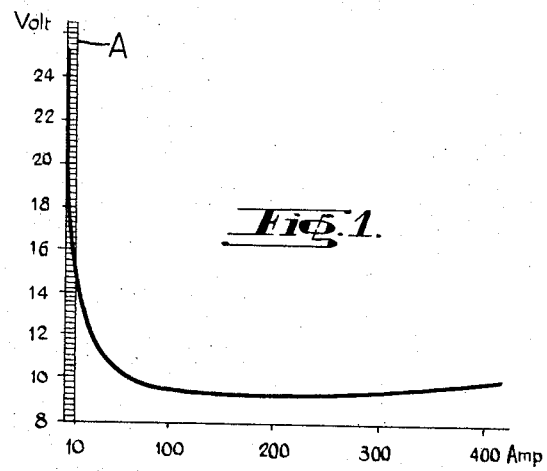
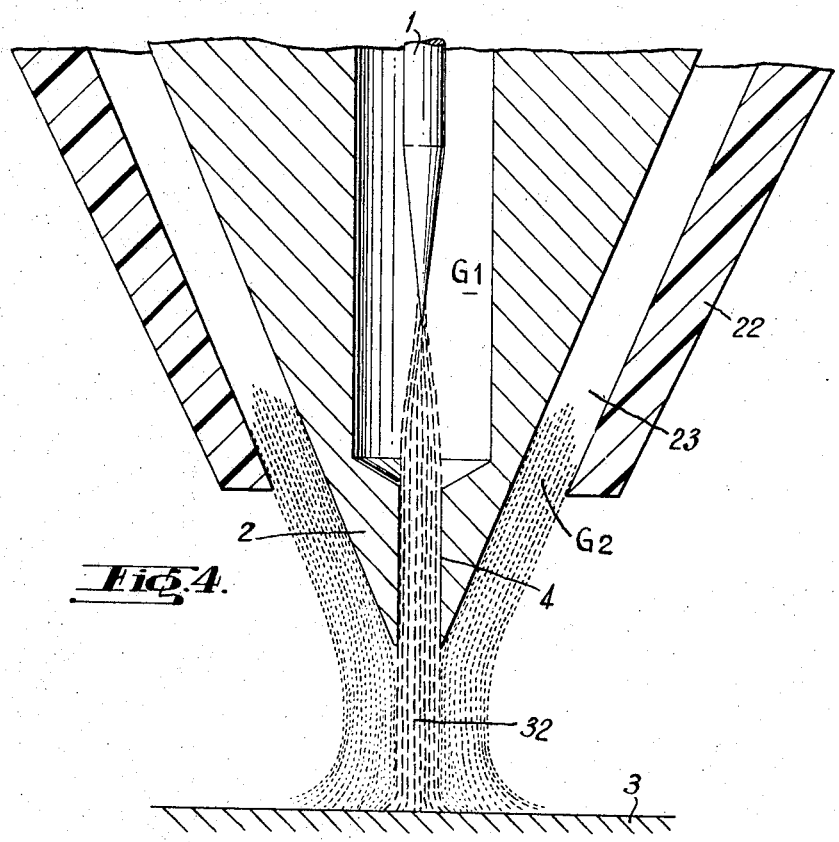

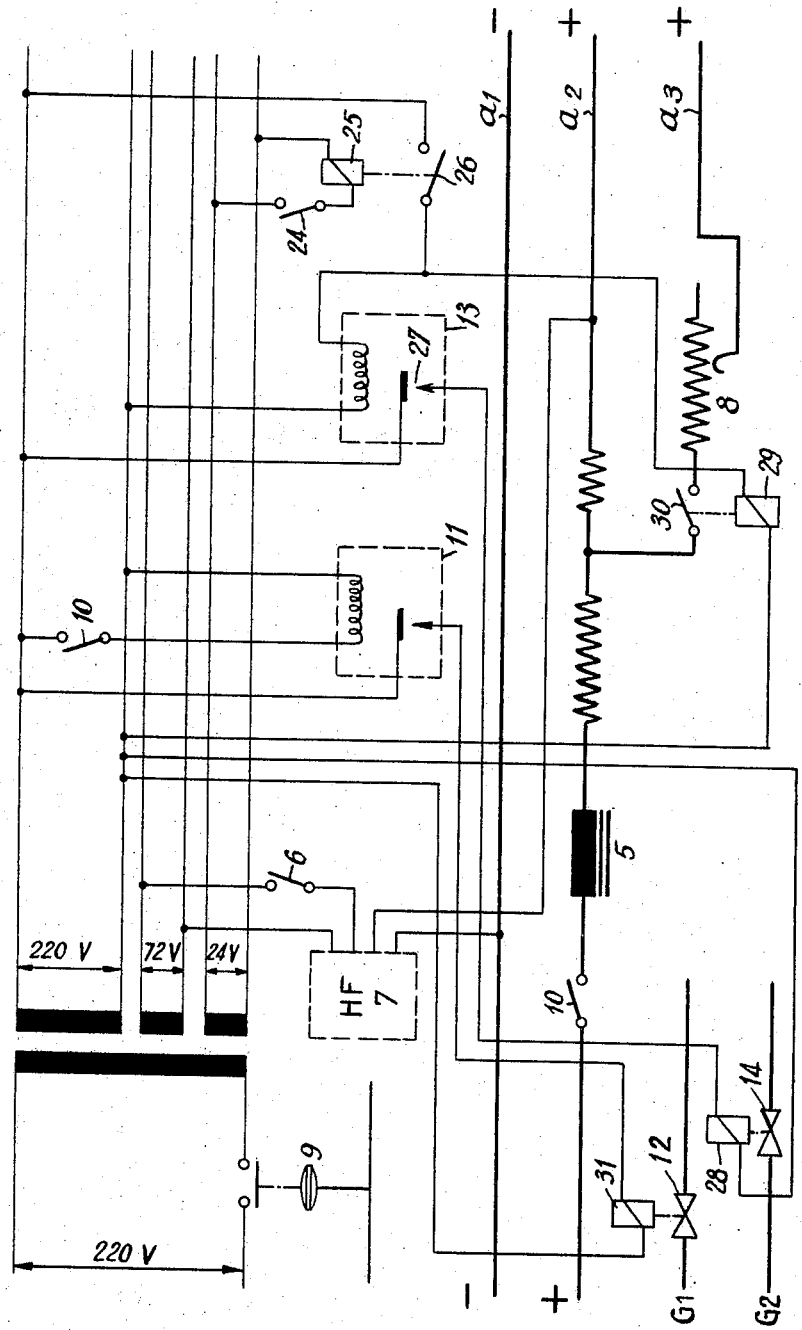

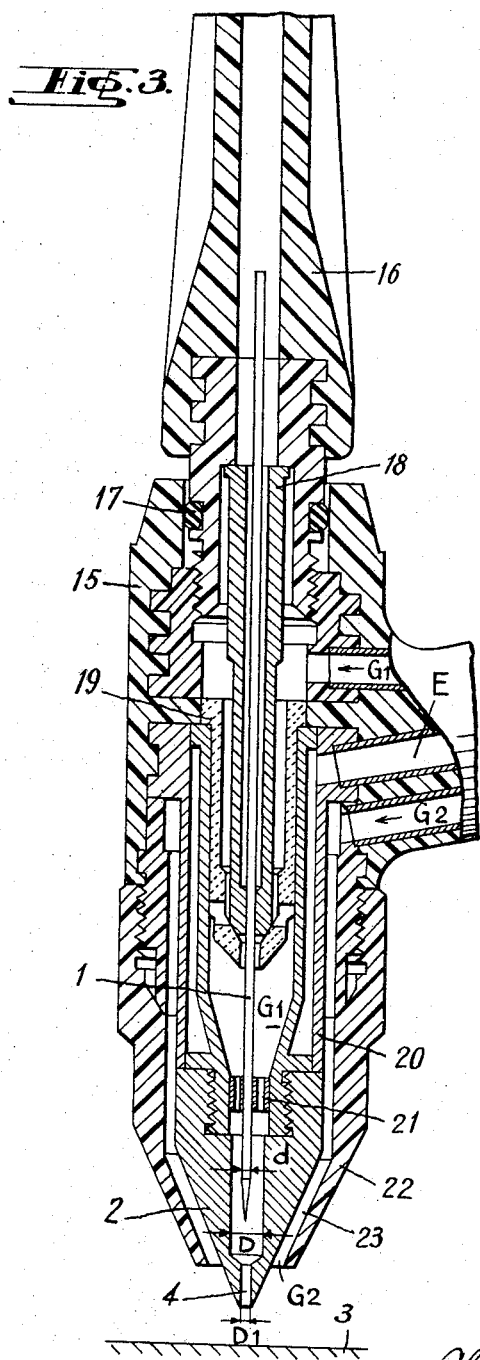

United States Patent Office 3,349,215
Patented Oct. 24, 1967

3,349,215
ARC PROCESS FOR WELDING WITH NON-CONSUMABLE ELECTRODES FOR WELDING THIN SHEETS
Alois Wagenleitner, Geneva, Maurice Montjovent, Nyon, and Heinz Liebisch, Geneva, Switzerland, assignors to Societe Anonyme des Ateliers de Secheron, Geneva, Switzerland, a corporation of Switzerland
Filed Dec. 15, 1966, Ser. No. 601,902
Claims priority, application Switzerland, May 11, 1964, 6,115/64
3 Claims. (Cl. 219—74)

ABSTRACT OF THE DISCLOSURE

The welding is accomplished by using a shielding atmosphere with a low power current intensity while stabilizing and maintaining the arc rigid along its aerial path. Substantially the entire surface of the aerial part of the arc is in contact with a shielding atmosphere substantially non-ionizable by the plasma of the arc. Such atmosphere may be formed at least partially by a dissociable gas or a rare gas having an ionization potential higher than that of the gas forming the plasma.

---

This application is a continuation-in-part of application Serial No. 453,641 filed May 6, 1965, entitled, "Arc Process for Welding With Non-Consumable Electrodes for Welding Thin Sheets," now abandoned.

The electric arc welding of various thin sheets, less than 0.5 mm. (e.g. for 0.05 mm.) requires feeble currents i.e. between 5 and 0.1 amps compared to those ordinarily used in conventional welding. Now it has been shown that for these currents numerous electrical and physical phenomena hamper the welding and often make it impossible to use the processes usually employed (such as the "TIG" process).

The attached drawings show, by way of example, an embodiment of the invention.

FIGURE 1 is an explanatory diagram.

FIGURE 2 is a circuit diagram for carrying out the method.

FIGURE 3 is an axial cross-sectional view of a welding torch for carrying out the method, and FIGURE 4 shows the lower part of FIGURE 3 to an enlarged scale.

FIGURE 1 shows the voltage characteristic in function of the intensity of a free electric arc for a distance of electrodes equal to 2 mm. in argon. It is known that for low current intensities the arc is unfit for welding, because under these conditions the region of use of the arc characteristic corresponds to an unstable operating zone shown by the shaded part A, FIG. 2, because the instability is due to the fact that the slope of the arc characteristic is strongly negative. A small variation in current thus results in a large variation in arc voltage. An arc instability is the result; the arc is easily influenced by external phenomena such as atmospheric perturbations, turbulence of the shielding gas, humidity, and atmospheric pressure. Its aerial path varies constantly as a function of these factors, as well as many others in particular, the respective states of the surface of the workpiece and the electrode. The anode and cathode spots are displaced in a fanciful manner according to the roughness of the surface. The formation of the weld puddle requires a very long time. The energy transport to the anode (workpiece) is slight. Among other things, ignition of the arc is made very unlikely when the electrode is slightly contaminated. As a result of all this, the welder has difficulty in starting the arc, in obtaining a correct weld puddle, and he can practically never direct it.

All this has resulted up to the present in that electric arc welding of thin metallic sheets was considered as impossible in industry.

Since a certain time, electric welding by means of a constricted arc is known. This method has been imagined mainly for welding thick pieces at high speed, due to the fact that it permits working with very strong intensities, thus at the high power which is necessary in these working conditions.

If one reduces the intensity of the welding current of a constricted arc under an inert gas protection to values compatible with the welding of very thin metal sheets (of the order of 1/100 to 1/10 mm., for example), one observes that the arc, which has been constricted in the constricting nozzle, enlarges excessively at the exit of the nozzle and loses all stability. It behaves like a flame and is no longer suitable for welding work.

The use of the constricted arc for operating under low intensity (from several amperes to 0.1 ampere, for example) seemed, therefore, quite impossible to persons skilled in the art.

We have found, however, that by proceeding in a special manner, it is possible to stabilize the constricted arc, at its exit from the constricting nozzle and down to the workpiece, for all low current intensities which are desirable for welding thin metal sheets, and even very thin sheets (for example, 1/100 to 0.1 mm. in thickness). In fact, according to the invention, the voltage-current characteristic of the constricted arc is altered by shifting the unstable part A (FIG. 1) to the immediate vicinity of the ordinate axis, so that even for welding currents of several hundred milliamperes, one is still in the more or less horizontal portion, or in any case on a low slope, of the characteristic, thus within the conditions for stable operation.

Thus has been solved in an elegant and unforeseen manner the problem of electric arc welding of thin and very thin metallic sheets, with the very low arc current intensities and the very low powers which are necessary so as not to damage such sheets, intensities which are considerably lower than the intensities used up to the present in industrial arc welding technique.

The present invention has for an object a method of welding thin metallic sheets by means of a constricted electric arc under shielding atmosphere, comprising limiting the current intensity of the welding arc in order to work under low power (for example, between 5 amps and a fraction of an amp) and in the range of intensities where the aerial path of the constricted arc is normally unstable, while at the same time one stabilizes and maintains the arc rigid along its aerial path (i.e. the part outside the constricting nozzle), by putting into contact with substantially the whole surface of this aerial path of the arc a shielding gaseous atmosphere substantially non-ionizable by the plasma of the arc.

The torch according to FIG. 3 is fed from a source of direct current. The negative conductor $a1$ is connected to the electrode 1, the positive conductor $a3$ is connected to the workpiece 3, and the conductor $a2$ at a lower positive voltage than that of $a3$, is connected to the nozzle 2. An auxiliary arc or "pilot arc" is established, as will be seen later on, between electrode 1 and the nozzle 2. A welding arc or "constricted arc" is established between the electrode 1 and the piece 3, through a duct 4 of the nozzle 2. An inductance 5 serves to reduce the wave amplitude of the rectified current, to assure a more stable and regular arc, being maintained without being sustained by a superposed high frequency voltage.

The rheostat 8 serves to adjust to the desired value the intensity of the welding arc current, as a function of the work to be carried out.

The constricted welding arc is thus superposed to the pilot arc which then has the role of sustaining the welding arc, especially for very weak currents, e.g. 0.8 amp. On the other hand when the welder pulls the welding arc in order to break it, the pilot arc alone subsists. The welder has then the choice either of starting again the main arc automatically by bringing the insert near the working piece or of opening the welding arc circuit by means of a switch, re-ignition of the welding arc being then obtained by means of the switch. The ignition of the pilot arc between the electrode and the insert is ensured by a high frequency pulse controlled by a push button (6) placed in the primary circuit of the high frequency generator (7).

The pre-ionization of the gas or the gas mixture $G_1$ forming the plasma resulting from the high frequency discharge leads to ignition of the pilot arc. This arc is blown to the outside of the insert and forms a visible spot having lighting power. The operator thus sees the welding zone lighted by the bright light emanating from the insert. This is very convenient for precision work.

It is interesting to know that the initial high frequency discharge is established when the electrode is very contaminated in spots, especially at its tip, because a radial discharge can be obtained at different levels leading to pre-ionization of the gas.

The non-consumable electrode is represented in FIG. 3 by piece 1; its diameter $d$ is much smaller than the interior diameter D of the insert 2. The ratio $D:d$ must be judiciously chosen. After trials the ratio $D:d$ was selected in the range between 3 and 4; the optimum value is $D:d=3.6$.

On the other hand the welder's possibility of returning to arc pilot operation at the end of a weld avoids the use of high frequency ignition, which is always detrimental to the electrode. This results in an appreciable increase in life of the electrode.

The current of the transferred, constricted arc used in the welding will be adjusted by the operator by means of the rheostat 8 in FIG. 2. For certain applications, the current can be very weak, some tenths of an amp. The transferred, constricted welding arc is sustained by the pilot arc which is maintained continuously. This permits an arc suitable for welding with very weak current to be maintained.

The gas $G_1$ forming the plasma flows as soon as the hand actuated multiple switch 10 is closed causing energization of a time relay 11 and then of a relay 31 actuating valve 12, high frequency ignition of the pilot arc is then possible. At the end of the operation, the time delay relay 11 retards the closing of the valve 12 of the gas circuit $G_1$. In FIG. 2 a second valve 14 is provided for a protective gas $G_2$, for protecting the weld puddle on the workpiece 3. The second gas (or mixture of gases) comes into contact with substantially the whole surface of the aerial path of the arc (i.e., the part of the arc outside the constricting nozzle 4).

The shape of the insert (FIG. 4) and of 22, as well as the oblique direction of the passage 23 from which the gas $G_2$ flows out towards the arc are such, as one can easily see on FIG. 4, as to ensure said contact of said gas with substantially the whole surface of the aerial path of the arc 24. Thus, said part of the arc remains constricted even with low electric current intensities in the arc.

The protective gas $G_2$ is turned on as follows when the pilot arc establishes the transferred arc. Closing (manually) switch 24 energizes an impulsion relay 25 (i.e., a relay which alternately closes and opens and again closes its contact 26 when energized by successive electric impulsions). When the impulsion relay 25 closes its contact 26, a second time relay 13 is energized. Contact 27 of relay 13 is thus closed and produces the energization of a relay 28 which actuates valve 14. On the other hand, closing the contact 26 energizes a relay 29 which closes its contact 30, thus establishing the main arc. The lag of second time relay 13 acting on the valve 14 ensures protection of the weld bead at the end of operation.

The torch represented in FIG. 3 is designed on the basis of principles inherent to the process described in order to give the transferred, constricted welding arc requisite rigidity, energy transfer, maneuverability and to guarantee effective protection of the puddle, thus assuring very regular weld beads free of oxidation.

The torch shown in FIG. 3 comprises also the following parts:

A body of insulating material 15, e.g. a thermosetting resin, in which converge channels for water E, gas $G_1$ and $G_2$ and electrical conductors;

An insulating mantle 16 for holding the electrode which is inserted into the body and provided with a watertight joint 17;

A tightening collar 18 with its support 19 for positioning the electrode 1;

A support for a conducting insert 20 at the end of which is fixed a ceramic centering piece 21; this support contains a channel for water to cool the movable insert 2;

A removable conducting insert 2 fixed on the support 20;

An envelope of insulating material opaque or transparent 22 directing the flow of protective gas $G_2$ all around the arc at its exit from the duct 4, down to the workpiece 3. The shape of the lower part of the insert 2 is such, as one can see in FIG. 4, as to ensure the contact of the gas $G_2$ with substantially the whole surface of the part of the arc 32 outside the insert 2.

The high-frequency discharge takes place radially over the whole free length (beyond 21) of the electrode 1 between the electrode and the insert 2. Thus, the gas $G_1$ will be pre-ionized at the interior of the insert 2 and the pilot arc can easily be started.

The insert itself 2 is pierced by a constriction of a diameter $D_1$ and of a well defined length determined by the work. The welding arc is forced to pass through in order to be established between the electrode and the workpiece. A constriction is thus placed in the arc path. More precisely, this is a diaphragm which is both "mechanical" of an imposed diameter and length and "thermal" since evacuation of heat is forced by water cooling of the insert support. When leaving this constriction, the arc has a very distinct shape, defined by the geometry of the diaphragm. It becomes very directional.

The ratio $D:D_1$ is chosen between 5.0–2.9, preferably $D:D_1=4$.

The physical principles resulting from this constriction are known and find here an original application, resolving a fundamental problem in the welding of very thin sheet, i.e. obtaining a rigid welding arc at very low currents.

By this means, the welder can direct the weld puddle, which is instantly formed, very precisely, even in those cases made difficult by the complexity of the geometrical forms of the parts to be assembled. In all movements of the torch, the arc maintains its direction along the axis of the diaphragm. The dimensions to adopt for the diaphragm vary with the nature (melting point) of the material being welded and the thickness of the sheets. This and the welding current have to be adjusted in accordance with the work to be done.

Because of the principle of constriction of the transferred welding arc, the protective gas or gas mixture $G_2$ must be very carefully chosen. The plasma forming gas $G_1$ is indeed raised to a very high degree of ionization. It is thus necessary to avoid having the gas $G_1$ ionize the gas $G_2$ at their common surface, for this would result in an ineffective arc having lost its stiffness. According to the invention, it is thus important to utilize a protective gas or gas mixture $G_2$ which the plasma formed by gas $G_1$ is practically incapable of ionizing. For this purpose, the protective gas or gas mixture $G_2$ is preferably dissociable, or at least partially dissociable. Within this requirement, various combinations of gas $G_1$ and $G_2$ are possible.

The gas or mixture of gases $G_1$ will be a rare gas like argon or a mixture of rare gases such as argon and helium, and possibly, with traces of hydrogen. For gas $G_2$ the choice depends on the nature of the material to be treated; dissociable gas like nitrogen and hydrogen and their mixtures, $CO_2$, as well as mixtures of rare gases with dissociable gases may be used, for example, argon with hydrogen. It is the presence, in the shielding atmosphere produced by $G_2$, of a dissociable gas, which prevents substantially the ionization of said atmosphere. Instead of a dissociable gas, one can also use for $G_2$ a rare gas like helium, having an ionization potential higher than that of the gas or gas mixture $G_1$, such gas $G_2$ would be also substantially non-ionizable by the plasma of the arc.

Sheets of various compositions—stainless steels, ferrous and non-ferrous metals, as well as their alloys—and with small thickness in the order of 0.06 mm. and less can be assembled, edge to edge, or overlapped. The sheets joined can be different thicknesses. The weld beads are very regular and free of any trace of oxidation. The process can also be used for spot welding thin films.

We claim:

1. A method of welding thin metallic sheets or the like, by means of a constricted electric arc under shielding atmosphere, comprising stabilizing and maintaining the arc rigid along its aerial path, by putting into contact with substantially the whole surface of this aerial path of the arc a shielding gaseous atmosphere substantially non-ionizable by the plasma of the arc.

2. A method of welding thin metallic sheets or the like, by means of a constricted electric arc under shielding atmosphere, comprising limiting the current intensity of the welding arc in order to work at low power and in the range of intensities where the aerial path of the constricted arc is normally unstable, while at the same time stabilizing and maintaining the arc rigid along its aerial path by putting into contact with substantially the whole surface of this aerial path of the arc a shielding gaseous atmosphere substantially non-ionizable by the plasma of the arc.

3. A method of welding thin metallic sheets or the like, by means of a constricted electric arc under shielding atmosphere, comprising working in the range of current intensities where the aerial path of the constricted arc is normally unstable, while at the same time stabilizing and maintaining the arc rigid along its aerial path by putting into contact with substantially the whole surface of this aerial path of the arc a shielding gaseous atmosphere substantially non-ionizable by the plasma of the arc.

References Cited

UNITED STATES PATENTS

| | | | |
|---|---|---|---|
| 2,806,124 | 9/1957 | Gage | 219—75 |
| 2,859,329 | 11/1958 | Lesnewich | 219—74 |

RICHARD M. WOOD, *Primary Examiner.*